(12) United States Patent
Papillon et al.

(10) Patent No.: US 12,432,639 B2
(45) Date of Patent: Sep. 30, 2025

(54) HANDOVER IN PRESENCE OF FALSE BASE STATIONS

(71) Applicant: Nokia Solutions and Networks Oy, Espoo (FI)

(72) Inventors: Serge Papillon, Massy (FR); Afef Feki, Massy (FR); Ahmad Awada, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/957,054

(22) Filed: Nov. 22, 2024

(65) Prior Publication Data

US 2025/0175877 A1     May 29, 2025

(30) Foreign Application Priority Data

Nov. 23, 2023   (FI) ...................................... 20236290

(51) Int. Cl.
     *H04W 36/00*     (2009.01)
     *H04W 36/36*     (2009.01)

(52) U.S. Cl.
     CPC ..... *H04W 36/362* (2023.05); *H04W 36/0085* (2018.08)

(58) Field of Classification Search
     CPC ..... H04W 12/00; H04W 12/08; H04W 12/12; H04W 12/69; H04W 12/79; H04W 36/00833; H04W 36/00837; H04W 36/0085; H04W 36/0088; H04W 36/36; H04W 36/362

See application file for complete search history.

(56) References Cited

U.S. PATENT DOCUMENTS

| 9,591,454 | B2 | 3/2017 | Julian et al. |
| 9,867,039 | B2 | 1/2018 | Wang et al. |
| 11,503,472 | B2 * | 11/2022 | Miao ..................... H04W 12/61 |

(Continued)

FOREIGN PATENT DOCUMENTS

| EP | 4109949 A1 | 12/2022 | |
| WO | WO-2009156126 A1 * | 12/2009 | ............. G01C 21/30 |

(Continued)

OTHER PUBLICATIONS

"3GPP Groups", 3GPP, Retrieved on Nov. 21, 2024, Webpage available at :https://www.3gpp.org/.

(Continued)

*Primary Examiner* — Matthew W Genack
(74) *Attorney, Agent, or Firm* — SQUIRE PATTON BOGGS (US) LLP

(57) ABSTRACT

The present subject matter relates to an apparatus for handover of a user equipment into a target base station of communication system, the apparatus comprising means, the means being configured for: in response to selecting the target base station for handover of the user equipment to the target base station performing a first handover method by at least: comparing a current set of cell measurements of the user equipment with reference sets of cell measurements for determining whether the target base station is a fake base station; performing a handover of the user equipment based on a determination that the target base station is not a fake base station.

19 Claims, 12 Drawing Sheets

(56) References Cited

U.S. PATENT DOCUMENTS

| | | | |
|---|---|---|---|
| 2013/0130695 A1 | 5/2013 | Ryu et al. | |
| 2017/0311170 A1* | 10/2017 | Jang | H04W 8/22 |
| 2018/0070239 A1 | 3/2018 | Norrman et al. | |
| 2020/0145859 A1 | 5/2020 | Nair | |
| 2021/0153025 A1 | 5/2021 | Agarwal et al. | |
| 2021/0333410 A1 | 10/2021 | Gum et al. | |
| 2022/0312249 A1* | 9/2022 | Rege | H04B 7/0695 |
| 2022/0394477 A1 | 12/2022 | Tsiatsis et al. | |
| 2022/0417819 A1* | 12/2022 | Cui | H04J 11/0093 |
| 2023/0095401 A1 | 3/2023 | Sivanesan et al. | |

FOREIGN PATENT DOCUMENTS

| | | | |
|---|---|---|---|
| WO | 2020/257308 A1 | 12/2020 | |
| WO | 2021/094221 A1 | 5/2021 | |
| WO | 2022/207093 A1 | 10/2022 | |
| WO | WO-2023160339 A1 * | 8/2023 | H04L 41/14 |

OTHER PUBLICATIONS

"3rd Generation Partnership Project; Technical Specification Group Services and System Aspects Study on 5G Security Enhancement against False Base Stations (FBS) (Release 18)", 3GPP TR 33.809, V0.18.0, Feb. 2022, pp. 1-130.

Karacay et al., "A Network-Based Positioning Method to Locate False Base Stations", IEEE Access, vol. 09, Aug. 9, 2021, pp. 111368-111382.

"3rd Generation Partnership Project; Technical Specification Group Radio Access Network; Evolved Universal Terrestrial Radio Access (E-UTRA); Requirements for support of radio resource management (Release 18)", 3GPP TS 36.133, V18.1.0, Mar. 2023, 4164 pages.

"3rd Generation Partnership Project; Technical Specification Group Radio Access Network; NR; Requirements for support of radio resource management (Release 18)", 3GPP TS 38.133, V18.1.0, Mar. 2023, 5925 pages.

"Msc-generator", Sourceforge, Retrieved on Nov. 21, 2024, Webpage available at :https://sourceforge.net/projects/msc-generator/.

"3rd Generation Partnership Project; Technical Specification Group Radio Access Network; NR; NR and NG-RAN Overall Description; Stage 2 (Release 17)", 3GPP TS 38.300, V17.4.0, Mar. 2023, pp. 1-210.

M, "Detection, Prevention and Mitigation of Rogue Base Stations in 5g Networks", Technical Disclosure Commons, Mar. 16, 2022, pp. 1-6.

Office action received for corresponding Finnish Patent Application No. 20236290, dated May 28, 2024, 9 pages.

"Protection against improper reselection to GERAN/UTRAN", 3GPP TSG-RAN WG2 Meeting #124, R2-2312866, Agenda: 7.24.2, Vodafone, Oct. 13-17, 2023, 5 pages.

Office action received for corresponding Finnish Patent Application No. 20236290, dated Oct. 24, 2024, 8 pages.

Extended European Search Report received for corresponding European Patent Application No. 24212254.7, dated Apr. 29, 2025, 9 pages.

* cited by examiner

HANDOVER IN PRESENCE OF FALSE BASE STATIONS

RELATED APPLICATION

This application claims benefit of priority from Finland patent App. No. 20236290, filed Nov. 23, 2023, the disclosure of which is hereby incorporated in its entirety by reference herein.

TECHNICAL FIELD

Various example embodiments relate to telecommunication systems, and more particularly to handover in presence of a false base station.

BACKGROUND

In generations of telecommunication network, the base stations may advertise their presence by sending over the air some connection information such as Master Information Blocks (MIB) and System Information Blocks (SIB). However, this information can be gathered by an attacker that may use the information to configure its own rogue base station to impersonate a base station of the telecommunication network. Some Rogue base stations can scan the MIB of genuine base stations to impersonate them. If such rogue base station is not that far from the impersonated one, this may raise issues.

SUMMARY

Example embodiments provide an apparatus for handover of a user equipment to a target base station of a communication system. The apparatus comprising: at least one processor; and at least one memory storing instructions that, when executed by the at least one processor, cause the apparatus at least to perform: providing reference sets of cell measurements, each reference set of cell measurements comprising cell measurements of a respective set of cells; in response to selecting the target base station for handover of the user equipment to the target base station performing a first handover method comprising at least: comparing a current set of cell measurements of the user equipment with the reference sets of cell measurements for determining whether the target base station is a fake base station; performing a handover of the user equipment based on a determination that the target base station is not a fake base station.

Example embodiments provide a method for handover of a user equipment into a target base station of a communication system. The method comprises: providing reference sets of cell measurements, each reference set of cell measurements comprising cell measurements of a respective set of cells; in response to selecting the target base station for handover of the user equipment to the target base station performing a first handover method comprising at least: comparing a current set of cell measurements of the user equipment with the reference sets of cell measurements for determining whether the target base station is a fake base station; performing a handover of the user equipment based on a determination that the target base station is not a fake base station.

Example embodiments provide a computer program comprising instructions for causing an apparatus for performing at least the following: in response to selecting a target base station for handover of a user equipment to the target base station performing a first handover method comprising at least: comparing a current set of cell measurements of the user equipment with reference sets of cell measurements for determining whether the target base station is a fake base station; performing a handover of the user equipment based on a determination that the target base station is not a fake base station.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
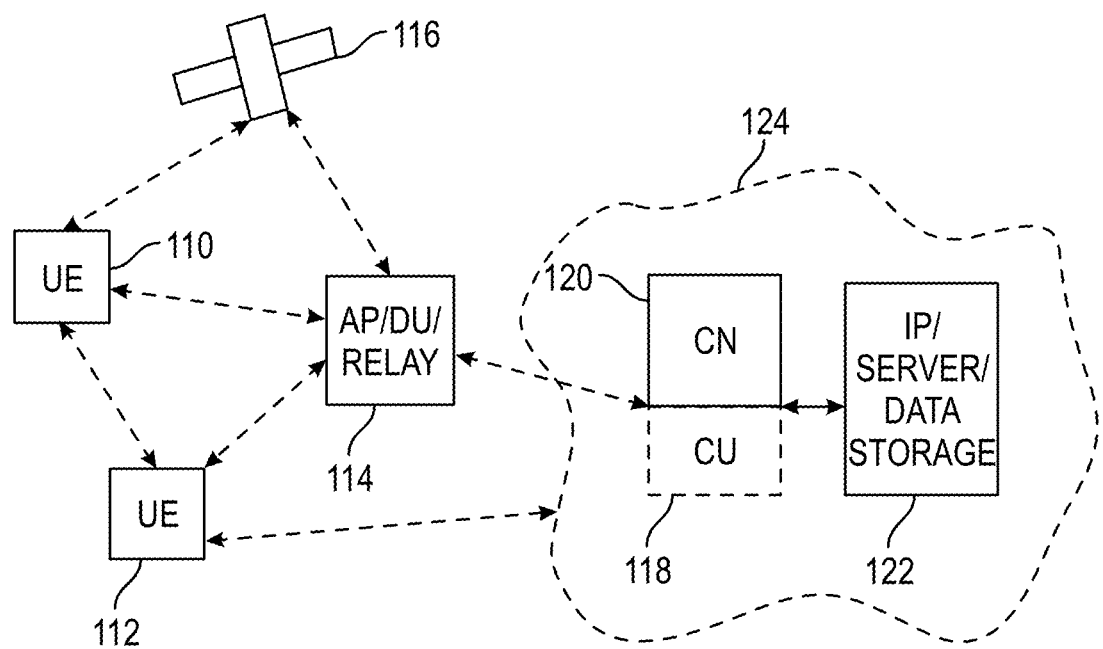
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

The communication system may be a wireless communication system. The communication system comprises base stations, wherein each base station may serve user equipments (UEs) located within the node's geographical area of service or a cell. The base station and its coverage area may collectively be referred to as a "cell". The cell may be identified by an identifier. The identifier may, for example, be a Physical Cell ID (PCI). The communication system may support one or more radio access technologies (RATs). A radio access technology of the radio access technologies may, for example, be evolved universal terrestrial radio access (E-UTRA) or 5G new radio (NR), but it is not limited to, as a person skilled in the art may apply the present subject matter to other communication systems provided with necessary properties.

The base station may, for example, be a Node B, enhanced or evolved NodeB (eNB), gNB, a home eNode B (HeNB), an access point (AP), a femto node, a femto base station, a transmit receive point (TRP), a base transceiver station (BTS) or any other equipment belonging to the communication system and implementing a radio communication interface. Providing different types of base stations may enable a flexible implementation of the present subject matter.

The base station of the communication system may be referred to as real base station or genuine base station or legitimate base station. The false base station may refer to a wireless device that impersonates genuine base stations. A false base station can also be referred to as a fake base station or illegitimate base station or rogue base station. Indeed, even if the false base station may be unable to establish a complete connection, e.g., lacking the cryptographic secret of the real operator, this may lead to handover failures. However, the network may consider that the handover failures are due to the impersonated base station. In some cases, if the rate of handover failures provoked by the false base station exceeds a certain threshold, this could lead to a blacklisting of the genuine base station. The present subject matter may solve this issue by preventing the user equipment from connecting to false base stations and thus preventing or mitigating handover failures caused by fake base stations and still enabling the handover to the real base station which is impersonated by the fake base station. For example, even if a fake base station advertises itself with an identifier (e.g., PCI) that is already used by an operator, the present method may distinguish the fake base station using a genuine PCI from the base station having the same PCI. Thus, the user equipments may still be able to connect to the real base station even in the presence of the fake base station using the same PCI. The present subject matter May enable the detection of the false base station before the effective handover (HO) execution is started e.g., the false base station may be detected even before the Random Access Channel (RACH) process started.

The user equipment may be configured to perform cell measurement (e.g., in connected mode, inactive mode or idle mode) of cells associated with the user equipment. The cells associated with the user equipment may comprise the cell serving the user equipment and one or more cells which are neighbors of the serving cell. For example, the user equipment may be configured to perform cell measurements of a cell serving the user equipment and of one or more cells which are neighboring of the serving cell. Measuring a cell may, for example, be performed by measuring (e.g., a power) of at least one beam of the cell. The beam measurement results may be combined (e.g., averaged) to derive a signal quality or cell quality of the cell. The signal quality may, for example, be a reference signal received power (RSRP) or reference signal received quality (RSRQ) measurement. Thus, the cell measurement may include a RSRP value or a RSRQ value.

The cell measurements of multiple user equipments may advantageously be used in accordance with the present subject matter in order to perform a handover of the user equipment. For that, previously performed cell measurements by the user equipments in the absence of the fake base stations in the communication system may be saved. This may provide reference sets of cell measurements. These may enable a baseline of a normal behavior which is created from historic collected information based on measurements between the user equipments and base stations, when there are no false base stations. The baseline may be used to check whether the same collected information in real time match the baselines or are considered as deviation. Each reference set of cell measurements may be performed by a user equipment. The reference sets of cell measurements may be performed by one or more user equipments. Each reference set of cell measurements are cell measurements of a specific set of cells associated with a user equipment that performed said set of cell measurements. The number of measured cells in each set of the reference sets of cell measurements may or may not be the same. In one example, the set of cell measurements may be the n strongest measurements of a set of n cells respectively.

For example, a data structure may be used to store the reference sets of cell measurements. Each entry or record of the data structure may represent a respective reference set of cell measurements e.g., if the reference sets of cell measurements comprise a number K of sets, the data structure may comprise K entries, one entry per set of cell measurements. The data structure may be used in real time processing in the communication system. For example, the data structure may be used to detect if a base station is a false base station. For that, a current set of cell measurements may be performed and provided by the user equipment that is going to be handed over by the serving base station to a target base station. The current set of cell measurements may have the same number of cell of measurements as the stored reference sets in the data structure. The first handover method may be performed using the current set of cell measurements e.g., by comparing the current set of cell measurements with the reference sets of cell measurements. For example, in response to determining based on the comparison result that the target base station is a fake base station, the handover of the user equipment to the target base station may not be performed. In response to determining based on the comparison result that the target base station is not a fake base station, the handover of the user equipment to the target base station may be performed.

In one example, the first handover method may be performed automatically for every target base station to which the user equipment is to be handed over. This may enable a safe and conservative approach to protect against rogue base stations. Alternatively, the first handover method may be performed conditionally. This may, for example, save processing resources that would otherwise be required to perform first handover method unconditionally. The conditional execution of the first handover method may also prevent or mitigate handover failures from fake base stations. For that, according to one example, it may be determined whether the target base station is part of a first list of candidate fake base stations and/or part of a second list of fake base stations. The first handover method may be performed in response to determining that the target base station is part of at least one of: the first list or the second list. In response to determining that the target base station is not part of the first list and not part of the second list, a second handover method may be performed by at least: performing a handover of the user equipment to the target base station.

The step of performing the handover in the second handover method or in the first handover method comprises the execution and/or the triggering of execution of steps that are usually executed upon a handover decision is made by the serving base station. The step of performing the handover may comprise the handover preparation phase and the handover execution phase. The serving base station may perform the handover by at least informing or preparing the target base station for handover and sending a handover command to the user equipment. The user equipment may detach from the serving base station and connect to the target base station in response to receiving the handover command.

The terms "First," or "Second," are used as labels for nouns that they precede, and do not imply any type of ordering (e.g., spatial, temporal, logical) unless explicitly defined as such.

The term "list" may refer to a collection of data items, each representing a base station. The list may be stored in the form of a table, a file, a tree structure etc.

The first list of candidate fake base stations may be referred to as a list of suspicious base stations. In one example, the first list of candidate fake base stations may comprise base stations which have a handover failure rate higher than a threshold, wherein said base stations were target base stations of the handover. Alternatively, or additionally, the first list of candidate fake base stations may comprise base stations which belong to a selected area of the communication system (e.g., even if a base station in the area does not have a high handover failure rate it may belong to the first list). In one example, the first list of candidate fake base stations may be updated on a periodic basis by adding one or more base stations to the first list and/or removing one or more base stations from the first list. For example, if one base station of the first list has a handover failure rate below a threshold for more than a configuration time, this base station may be removed from the first list. The first list may be stored in a database or any other storage.

The current set of cell measurements may comprise at least: a cell measurement of a cell covered by the serving base station of the user equipment and another cell measurement of a target cell covered by the target base station. The apparatus according to the present subject matter may be comprised in the serving base station of the user equipment. The current set of cell measurements may, for example, be part of a measurement report that is received by the apparatus from the user equipment. The measurement report may be sent by the user equipment to the apparatus in response to detecting by the user equipment a handover event.

In one example, the comparison of the current set of cell measurements of the user equipment with the reference sets of cell measurements for determining whether the target base station is a fake base station is performed in accordance with a first detection algorithm. The first detection algorithm may be referred to as unitary fake BTS detection algorithm. The first detection algorithm may, for example, indicate a criterion for classifying the target base station as fake base station based on the comparison.

In one example, the first detection algorithm may comprise the steps of: identifying a minimum deviation of the current set of cell measurements from the reference sets, comparing the minimum deviation with a threshold, and determining that the target base station is a fake base station in case the minimum deviation exceeds the threshold.

In one example, the first detection algorithm may require the comparison to be performed between the sets of cell measurements which involve the same cells. For that, the comparison of the current set of cell measurements with the reference sets of cell measurements may comprise: selecting a subset of the reference sets of cell measurements, such that each reference set of measurements that belongs to the subset are measurements of the same cells measured by the current set of cell measurements. The comparison is then performed between the current set of cell measurements and the subset of reference sets of cell measurements.

In one example, the number of cell measurements in each set of cell measurements may be n. Each reference set of cell measurements may be represented by a point in a respective n-dimensional (n-D) space e.g., the point may be a vector of size n having the values of the cell measurements respectively. For example, the reference sets of cell measurements may be represented in multiple n-dimensional spaces, wherein each n-dimensional space has dimensions (and axes) defined by a specific set of cells whose cell measurements are represented by points in the space.

The n-dimensional space may be defined by one axis per cell measurement of the set of cell measurements e.g., the n-dimensional space may be provided with n axes, wherein each axis represents a specific cell (e.g., a specific PCI). The n-dimensional space may, for example, be stored as a graph or as another data structure. The n-dimensional space may be divided into n-D bins e.g., for a three-dimensional space each 3-D bin may be a cube. For that, each axis of the n-dimensional space may be divided into a number m of equally-sized segments, each segment representing 1-D bin. The n-dimensional space may thus comprise a number $m^n$ of n-D bins. The bins along each axis may, for example, be numbered following a predefined numbering scheme e.g., the bins may be numbered sequenced so that bin 0 is the first bin of the sequence, bin 1 is the second bin of the sequence and so forth. Each cell measurement of a cell may be normalized or transformed such that it can be mapped into a respective bin number along the axis representing said cell. Thus, each point of the n-dimensional space may belong to a respective n-D bin. Each point p in the n-dimensional space may have as coordinates the list of bins into which the set of cell measurements of the point p are mapped respectively. For example, if the cell measurements of a point are mapped into the first bins of all axes of the n-D space, that point may have coordinates (0,0,0 . . . ,0). The points along one axis of the n-dimensional space may be points that share the same coordinates along the remaining n−1 axes. The points along each axis may be projected on the space which is defined by the n−1 remaining axes. Thus, the n-dimensional space may be stored as a number n of (n−1)-dimensional projected spaces. Each (n−1)-dimensional projected space may comprise (n−1)-D bins. For each (n−1)-D bin in each (n−1)-dimensional space (having n−1 axes and excluding axis "Ax"), the highest value points that share that (n−1)-D bin may be kept, wherein the highest value is the highest of the cell measurements of the cell represented on the axis "Ax". For example, in case of a 3-D space (A,B,C) having axes A, B and C, three 2-D spaces may be created, namely (A,B), (B,C) and (A,C). The coordinates of four points of the 3-D space may be as follows: {(1,0,0), (0,1,0), (0,0,1), (1,0,1)}, where values of each triplet represent axes A, B and C respectively. The projection of the four points along the 2-D space (A,B) may be performed as follows. The 2-D bins of the 2-D space (A,B) may be identified as follows: (1,0), (0,1), (0,0) and (1,0). For each of the 2-D bins, the maximum value, along the axis C, of the points that share that bin may be assigned to the 2-D bin. E.g., for the 2-D bin (1,0), two points along the axis C share that bin (1,0), namely the points (1,0,0) and (1,0,1). The maximum value along axis C of these two points is "1". This maximum value "1" may thus be assigned to the bin (1,0). The current set of cell measurements may be represented by a given point in the n-dimensional space. In this case the coordinate of the given point in the (n−1)-D space defined by axes that correspond to the cells (e.g. PCIs) not under scrutiny may be used to get the maximum value assigned to the corresponding (n−1)-dimensional bin, and the value of the given point that represents the PCI under scrutiny may be compared to the maximum value. If it is high than or equal to the maximum value, then it is considered as a fake BTS (FBTS). Following the above example of cells A, B and C and assuming that the cell C is under scrutiny and the current set of cell measurements may be represented by the point (1,0,0), the cell measurement value (i.e., 0) of cell C in the current set may be compared against the maximum value 1 which is assigned to the 2-D bin (1,0), and since it is smaller than the maximum value, the corresponding BTS may be considered as real BTS.

The present subject matter may use the first detection algorithm to build the second list of fake base stations. For that, the first detection algorithm may be executed multiple times for different user equipments in the communication system in order to identify base stations which are fake base stations. For example, during a given time period (e.g., a given year), for each user equipment X that is going to be handed over to a target base station Y of the communication system, the first detection algorithm may be executed by comparing the set of cell measurements which are performed by the user equipment X with the reference sets and based on the comparison result, the target base station Y may be classified as fake base station or not fake base station.

This may result in a plurality of fake base stations, wherein each fake base station is associated with metadata. The metadata of each fake base station may, for example, indicate an occurrence number which is the number of times that the base station was classified as fake base station during the given time period. In addition, the present subject matter may further filter this plurality of fake base stations by executing a second detection algorithm. That is, the execution of the first detection algorithm may be followed by the execution of the second detection algorithm. The second detection algorithm may be referred to as fake BTS detection algorithm. The second detection algorithm may, for example, comprise the steps of: comparing the occurrence number of each fake base station of the plurality of fake base stations with a threshold number, and in case the occurrence number exceeds (e.g., is higher than) the threshold number, the fake base station may be added to the second list. This two-detection stage process may reduce the initial number of identified fake base stations. This may save processing resources that would otherwise be required to process a higher number of fake base stations identified by the first detection algorithm only. This may also provide an accurate list of fake base stations.

In another example, the second detection algorithm may be executed conditionally. The second detection algorithm may be executed in response to determining that the false positive rate of the first detection algorithm is higher than a maximum rate. The false positive rate may be defined as the ratio FP/(FP+TN) where FP is the number of falsely detected fake base stations and TN is the number of true fake base stations.

The present subject matter may enable a controlled execution of the second detection algorithm by using the threshold number as a configurable parameter. In one example, the threshold number may be set to a value equal to 0, 1, 2, 3, 4, 5, 10, 15 or any other positive integer number that can be used to identify fake base stations. The value zero of the threshold number may enable to switch off the effect of the second detection algorithm without having to make significant changes in the setup. The second list may be stored in a database or any other storage.

As described above, the second list may be built during a given time period. This may enable to obtain the second list before its usage. Alternatively, the second list may be built continuously by updating it regularly. This may provide an up-to-date list of fake base stations. According to one example, if the comparison of the current set of cell measurements with the reference sets of cell measurements indicates that the target base station is a fake base station and the target base station was not part of the second list, the target base station may be added to the second list. Adding a base station to the first or second list means that an identifier (such as PCI) indicating the base station may be included in the list. This example may enable to update the second list and thus keep it up-to-date. This example may also enable to build the second list in real-time during operation of the communication system.

According to one example, the current set of cell measurements is automatically received by the apparatus from the user equipment. For example, the apparatus may make a handover decision toward the target base station based on the automatically received current set of cell measurements. Alternatively, the apparatus may send a message to the user equipment requesting the current set of cells measurements, wherein the current set of cell measurements is received by the apparatus in response to sending the message to the user equipment. For example, the apparatus may make a handover decision toward the target base station based on the automatically received current set of cell measurements.

According to one example, the apparatus may receive automatically an initial current set of cell measurements from the user equipment. For example, the apparatus may make a handover decision toward the target base station based on the initial current set of cell measurements. Next, the apparatus may determine whether the initial current set of cell measurements has a same number of measurements as the reference sets e.g., it may determine whether the number of initial current set of cell measurements is equal to the number of measurements in any reference set of cell measurements. In response to determining that the initial current set of cell measurements has a number of measurements different from (e.g., smaller than) the number of the measurements in each reference set, the user equipment may be configured to perform and send the current set of measurements. In case the initial current set of cell measurements has the same number of measurements as the reference sets, the current set of cell measurements is the initial set of cell measurements.

According to one example, the comparison of the current set of cell measurements with the reference sets of cell measurement comprises: identifying a minimum deviation of the current set of cell measurements from the predefined reference sets; comparing the minimum deviation with a threshold; and in response to determining that the minimum deviation exceeds the threshold, determining that the target base station is a fake base station.

According to one example, the identifying of the minimum deviation comprises computing the deviations between the current set of cell measurements from the reference sets using a similarity metric, and selecting the lowest computed deviation. The similarity metric may, for example, be a distance metric such as Euclidean distance and Manhattan distance e.g., the deviation may be a Euclidian distance.

According to one example, the first handover method is performed continuously or upon receiving a request by the apparatus. The first handover method is performed continuously means that the first handover method is performed unconditionally or automatically upon selecting the target base station. This may provide a secure and conservative approach and a simplified implementation compared to a conditional execution approach. The execution of the first handover method upon request may be advantageous as exemplified in the following. For example, the request which is received by the apparatus may comprise one or more candidate fake base stations of the first list. This may enable a user to switch on the first handover method in case the user has identified the one or more candidate fake base stations.

According to one example, in response to selecting the target base station for handover of the user equipment to the target base station and in case the request is not received by the apparatus, a handover of the user equipment to the target base station may be performed using the second handover method e.g., without performing the check of the current set of cell measurements against the reference sets of cells measurements.

According to one example, the reference sets of cell measurements are updated by at least one of: adding sets of cell measurements or removing sets of cell measurements. The update may, for example, be performed (regularly) on a periodic basis, e.g., every week, or upon receiving an update request. This may enable an accurate handover decision based on up-to-date data.

According to one example, the reference sets of cell measurements are stored in a database, wherein each record of the database represents a respective set of cell measurements of the reference sets of cell measurements. For example, the database may comprise a table having columns associated with the measured cells and each row of the table represents one reference set of cell measurements. This example may be seamlessly integrated with existing database access techniques.

According to one example, the reference sets of cell measurements are stored in a tree structure in a database, wherein the tree structure of the database represents a respective reference set of cell measurements of the reference sets of cell measurements. For example, in case the number of cell measurements is higher than three the tree structure may be k-d tree. In case the number of the set of cell measurements is two or three (n=2 or n=3), the tree structure may be a quadtree or octree respectively. The database may thus be referred to as quadtree database or octree database respectively.

In case the number of the set of cell measurements is three, n=3, each reference set of cell measurements (point) may be approximated with a respective octree. The depth of the octree may provide the precision of the approximation. The baseline or references may, for example, consist in a dictionary of cell triplets keys, to each triplet corresponding an octree. In real time, the n best cell measurements may be gathered from a UE and the values may be checked to be included in the corresponding octree. Using octrees may be advantageous for the following reasons. Checking if a 3-D point is inside an octree or inserting a new point may be a very fast operation; the time complexity may be in O(depth).

The nearest neighbor search may be used for the comparison of the current set of cell measurements with the reference sets of cells measurements. The nearest neighbor search may be used as an alternative metric instead of the simple inclusion. This search may be fast (logarithmic time) and may enable to use a threshold for the distance to the nearest neighbor to be considered as a deviation, for a tunable sensibility of the detection of the fake base station.

According to one example, the comparison of the current set of cell measurements with the reference sets of cells measurement comprises: determining whether the current set of cell measurements corresponds to a tree structure of the database; in response to determining that the current set of cell measurements does not correspond to a tree structure of the database, determining that the target base station is a fake base station.

According to one example, the set of cell measurements comprises n cell measurements, wherein n is 2, 3, 4 or another number of measurements that can be used in accordance with the present subject matter. The n cell measurements may be the highest cell measurements of a larger number of cell measurements. For example, each user equipment may perform a number N of cell measurements and select the highest n cell measurements of the N cell measurements, where N is higher than n. For example, the current set of cell measurements may comprise n cell measurements and each reference set of the reference sets of cell measurements comprises n cell measurements.

The present subject matter may comprise the following examples.

Example 1

An apparatus for handover of a user equipment into a target base station of a communication system, the apparatus comprising: at least one processor; and at least one memory storing instructions that, when executed by the at least one processor, cause the apparatus at least to perform: in response to selecting the target base station for handover of the user equipment to the target base station performing a first handover method by at least: comparing a current set of cell measurements of the user equipment with reference sets of cell measurements for determining whether the target base station is a fake base station, each set of cell measurements comprises cell measurements of a respective set of cells; performing a handover of the user equipment based on a determination that the target base station is not a fake base station.

Example 2

A non-transitory computer readable medium comprising program instructions that, when executed by an apparatus, cause the apparatus to perform at least the following: in response to selecting a target base station for handover of a user equipment to the target base station performing a first handover method by at least: comparing a current set of cell measurements of the user equipment with reference sets of cell measurements for determining whether the target base station is a fake base station, each set of cell measurements comprises cell measurements of a respective set of cells; performing a handover of the user equipment based on a determination that the target base station is not a fake base station.

The present subject matter may comprise the following clauses.

Clause 1. An apparatus for handover of a user equipment to a target base station of a communication system, the apparatus comprising means, the means being configured for: providing reference sets of cell measurements, each reference set of cell measurements comprising cell measurements of a respective set of cells; in response to selecting the target base station for handover of the user equipment to the target base station performing a first handover method comprising at least: comparing a current set of cell measurements of the user equipment with the reference sets of cell measurements for determining whether the target base station is a fake base station; performing a handover of the user equipment based on a determination that the target base station is not a fake base station.

Clause 2. The apparatus of clause 1, the means being configured for: determining whether the target base station is part of at least one of: a first list of candidate fake base stations or a second list of fake base stations; in response to determining that the target base station is part of at least one of the first list or the second list, performing the first handover method; in response to determining that the target base station is not part of the first and second lists performing a second handover method comprising at least: performing a handover of the user equipment to the target base station.

Clause 3. The apparatus of clause 2, the means being configured for: adding to the second list the target base station if the target base station is a fake base station and is not part of the second list.

Clause 4. The apparatus of clause 2 or 3, wherein the comparison of the current set of cell measurements of the user equipment with the reference sets of cell measurements for determining whether the target base station is a fake base station is performed in accordance with a first detection algorithm, the means being configured for building the second list of fake base stations by at least: executing the first detection algorithm multiple times for different user equipments, resulting in determinations of respective fake base stations; adding each resulting fake base station to the list based on the number of times the base station was detected as fake base station.

Clause 5. The apparatus of any of the preceding clauses 1 to 4, the means being configured for performing the comparing of the current set of cell measurements with the reference sets of cells measurement comprising at least: identifying a minimum deviation of the current set of cell measurements from the reference sets; comparing the minimum deviation with a threshold; and in response to determining that the minimum deviation exceeds the threshold, determining that the target base station is a fake base station.

Clause 6. The apparatus of clause 5, the means being configured for identifying the minimum deviation by at least computing the deviations between the current set of cell measurements from the reference sets using a similarity metric, and selecting the lowest computed deviation.

Clause 7. The apparatus of any of the preceding clauses 1 to 6, the number of cell measurements being n, the means being configured for: determining a n-dimensional space of points whose axes are associated with the n cells, wherein each point represents a respective reference set of cell measurements; projecting the points along each axis, thereby creating a number n of (n−1)-dimensional projected spaces associated with the cells respectively; using the (n−1)-dimensional projected spaces for comparing the current set of cell measurements with the reference sets of cell measurements.

Clause 8. The apparatus of any of the preceding clauses 1 to 7, the means being configured for performing the first handover method automatically or upon receiving a request.

Clause 9. The apparatus of clause 8, wherein in response to selecting the target base station for handover of the user equipment to the target base station and in case the request is not received, the means is configured for performing a second handover method.

Clause 10. The apparatus of any of the preceding clauses 1 to 9, the means being configured for regularly updating the reference sets of cell measurements by at least one of: adding sets of cell measurements or removing sets of cell measurements.

Clause 11. The apparatus of any of the preceding clauses 1 to 10, the means being configured for storing the reference sets of cell measurements in a database, wherein each record of the database represents a respective set of cell measurements of the reference sets of cell measurements.

Clause 12. The apparatus of any of the preceding clauses 1 to 11, the means being configured for storing the predefined sets of cell measurements in an octree database, wherein the octree of the octree database represents a respective set of cell measurements of the predefined sets of cell measurements.

Clause 13. The apparatus of clause 12, the means being configured for comparing the current set of cell measurements with the reference sets of cells measurement by at least: determining whether the current set of cell measurements corresponds to an octree of the octree database; in response to determining that the current set of cell measurements does not correspond to an octree of the octree database, determining that the target base station is a fake base station.

Clause 14. The apparatus of any of the preceding clauses 1 to 13, wherein the set of cell measurements comprises the highest n cell measurements, wherein n is 2, 3, 4 or another number of measurements that can be used for the determining whether the target base station is a fake base station.

Clause 15. The apparatus of any of the preceding clauses 1 to 14, the cell measurement being a reference signal received power (RSRP) or reference signal received quality (RSRQ) measurement.

Clause 16. The apparatus of any of the preceding clauses 1 to 15, the means being configured for receiving the current set of cell measurements automatically or upon sending a message to the user equipment.

Clause 17. The apparatus of any of the preceding clauses 1 to 16, the means being configured for: receiving automatically an initial current set of cell measurements from the user equipment; determining whether the initial current set of cell measurements has a same number of measurements as the reference sets; in response to determining that the initial current set of cell measurements has a different number of measurements compared to the reference sets, controlling the user equipment to perform and send the current set of measurements; wherein in case the initial current set of cell measurements has the same number of measurements as the reference sets, the current set of cell measurements is the initial current set of cell measurements.

Clause 18. A system comprising an apparatus of any of the preceding clauses 1 to 17 and the user equipment, the apparatus being a base station serving the user equipment, the user equipment being configured to handover according to the first handover method to the target base station in response to the apparatus performing the handover.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows devices 110 and 112. The devices 110 and 112 may, for example, be user devices. The devices 110 and 112 are configured to be in a wireless connection on one or more communication channels with a node 114. The node 114 is further connected to a core network 120. In one example, the node 114 may be an access node (such as (e/g) NodeB) 114 providing or serving devices in a cell. In one example, the node 114 may be a non-3GPP access node. The physical link from a device to a (e/g) NodeB is called uplink or reverse link and the physical link from the (e/g) NodeB to the device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signaling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to devices. The antenna unit may comprise a plurality of antennas or antenna elements. The (e/g) NodeB is further connected to the core network 120 (CN or next generation core NGC). For example, the (e/g) NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented. 5G enables using multiple input—multiple output (MIMO) antennas, many more base stations or nodes than an existing LTE system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHZ, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by reference numeral 122, or utilize services provided by them. The communication network may also be able to support the usage of cloud services, for example at least part of core network operations may be carried out as a cloud service (this is depicted in FIG. 1 by "cloud" 124). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 114) and non-real time functions being carried out in a centralized manner (in a centralized unit, CU 118).

It should also be understood that the distribution of labour between core network operations and base station operations may differ from that of the LTE or even be non-existent. Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 116 in the mega-constellation may cover several satellite-enabled network entities that create on-ground cells. The on-ground cells may be created via an on-ground relay node 114 or by a gNB located on-ground or in a satellite.

It is understandable for a person skilled in the art that the depicted system is only an example of a part of a radio access system and in practice, the system may comprise a plurality of (e/g) NodeBs, the device may have an access to a plurality of radio cells and the system may comprise also other apparatuses, such as physical layer relay nodes or other network elements, etc. One of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
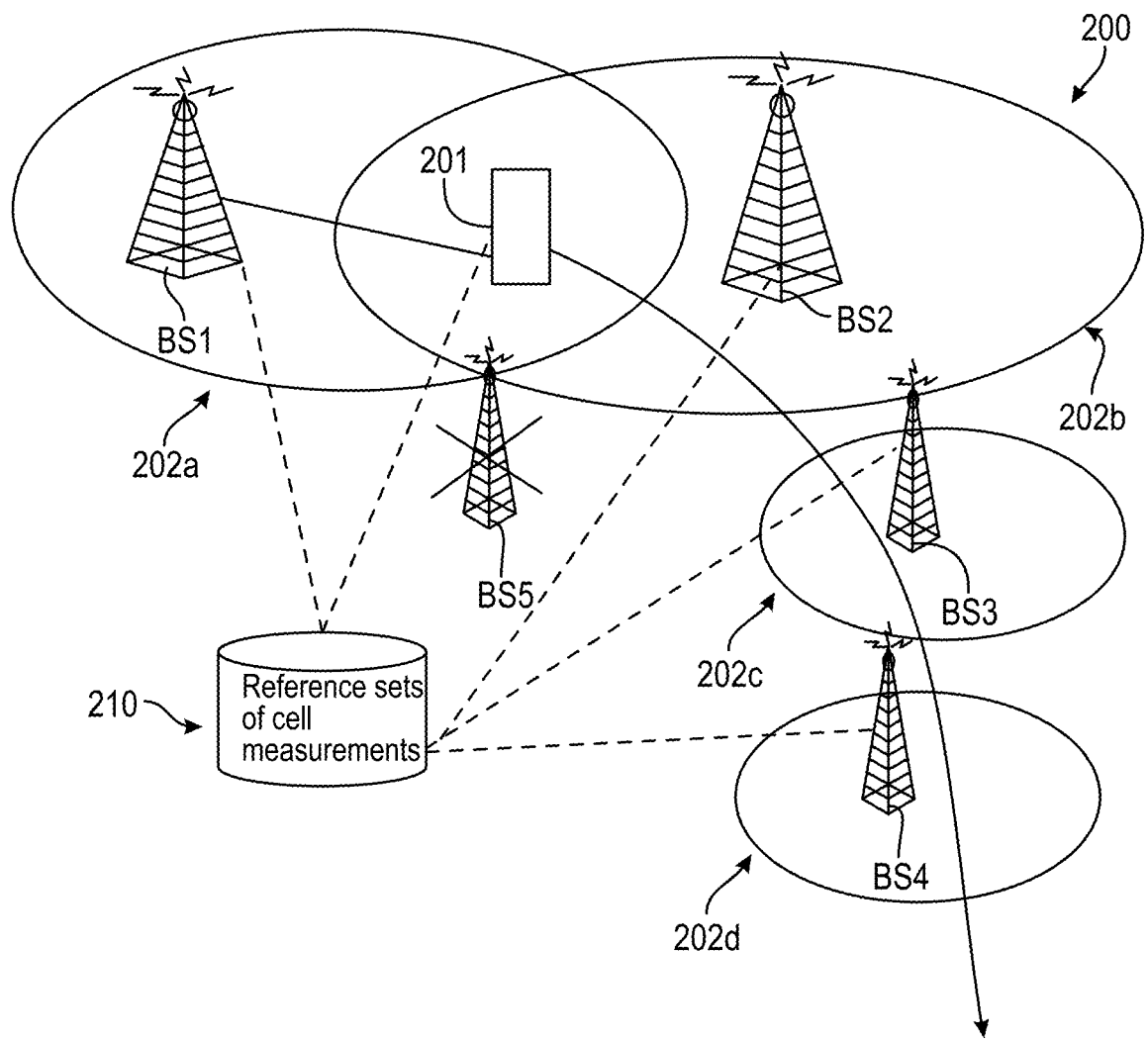
FIG. 2 is a schematic illustration of a wireless communication system.

FIG. 2 is a schematic illustration of a wireless communication system 200. The communication system 200 may be configured to use a time division duplex (TDD) technique for data transmission.

For simplicity, communication system 200 is shown to include four base stations BS1, BS2, BS3, and BS4 and a user equipment 201. The base stations BS1, BS2, BS3, and BS4 may, for example, be eNodeBs and/or gNBs e.g., as described with reference to FIG. 1. That is, the communication system 200 may support a same RAT or different RATs.

Each of the base stations BS1, BS2, BS3, and BS4 may serve UEs within a respective geographical coverage area of service. The base station and its coverage area may collectively be referred to as a "cell". The cells of the communication system 200 are labeled 202a, 202b, 202c and 202d.

FIG. 2 further shows a fake base station BS5 which is implemented in the communication system 200 near the base stations BS1, BS2, BS3, and BS4.

In this particular example, the user equipment 201 is moving from the left to the right toward any one of the base stations BS2, BS3, and BS4 and the fake base station BS5.

Initially, the user equipment 201 is associated with the cell 202a. The cell 202a may be a serving or source cell of the user equipment 201. Accordingly, the base station BS1 may be a serving or source base station of the user equipment 201.

Each of the neighbor cells 202b through 202d may be on a same carrier or different carrier of the serving cell 202a. While the user equipment 201 is moving from the left to the right, it is configured to perform neighbor cell measurements of neighbor cells and to report them e.g., to the serving base station.

The communication system 200 may be provided with reference sets of cell measurements 210 which are performed in the absence of fake base stations in the communication system 200, wherein each reference set of cell measurements comprises cell measurements of a respective set of cells. The reference sets of cell measurements 210 may, for example, be stored in a database which is shared between the base stations BS1, BS2, BS3, and BS4. In one example, the database may further be shared with the UE 201. The reference sets of cell measurements 210 may, for example, be obtained from historical measurement reports (involving serving BS+k best neighbor BSs), while handover failure rate is below 5%. If the historical measurements don't have the wanted number of measurements, a signaling message may be sent to the UEs (e.g., in the selected global area to be baselined) to report the right number of cell measurements.

Figure 3:
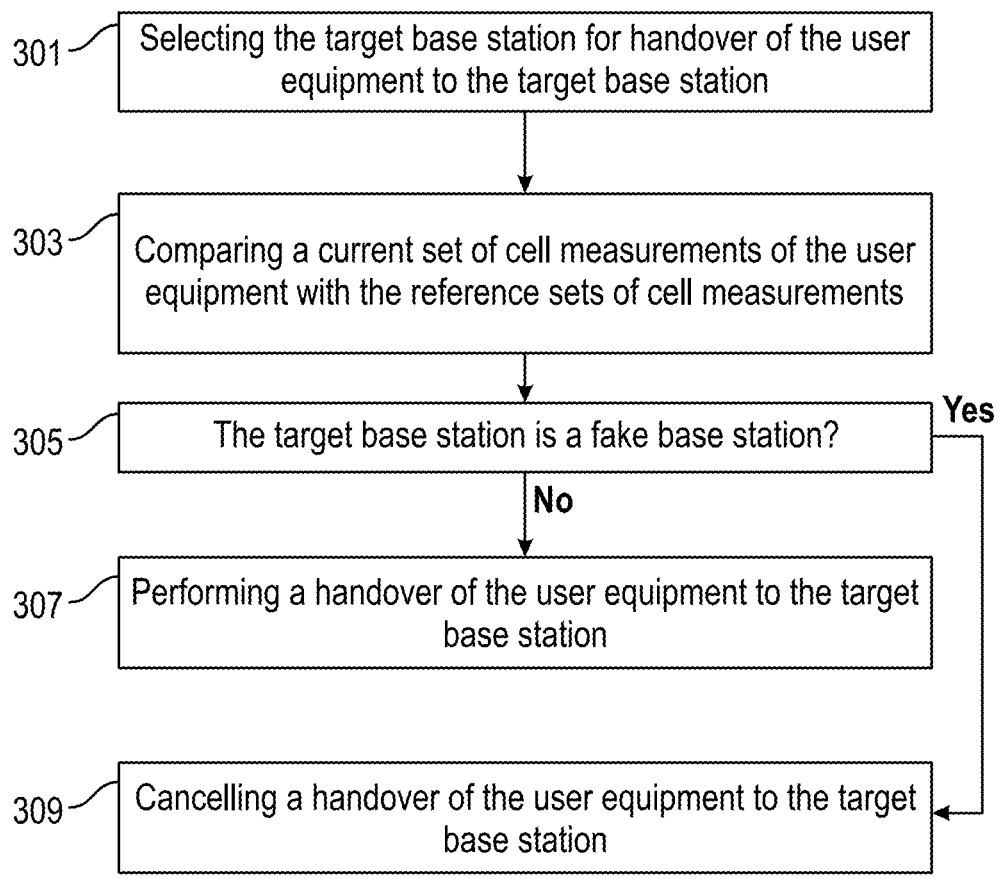
FIG. 3 is a flowchart of a method for handover according to an example of the present subject matter.

FIG. 3 is a flowchart of a method for handover of a user equipment into a target base station of a communication system according to an example of the present subject matter. For the purpose of explanation, the method described in FIG. 3 may be implemented in the system illustrated in FIG. 2, but is not limited to this implementation. The method may, for example, be performed for handover of the UE 201 to the target base station BS2 or the fake base station BS5. The method may, for example, be performed by the serving base station BS1.

A handover event may occur due to the movement of the user equipment toward the base station BS2 or the fake base station BS5. The serving base station BS1 may select in step 301 the target base station for handover of the user equipment to the target base station. In response to selecting the target base station for handover of the user equipment to the target base station, the serving base station BS1 may perform the first handover method comprising steps 303 to 309. In step 303, the serving base station BS1 may compare a current set of cell measurements of the user equipment with the reference sets 210. Based on the comparison result, the serving base station BS1 may determine in step 305 whether the target base station is a fake base station. The serving base station BS1 may perform or complete in step 307 a handover of the user equipment to the target base station if the target base station is not a fake base station; otherwise, the handover to the target base station may be cancelled in step 309. For example, if there is a mismatch between the current set of cell measurements of the user equipment and the reference sets 210, the serving base station BS1 may search another target base station for enabling handover of the user equipment to the other target base station. If there is a match between the current set of cell measurements of the user equipment and the reference sets 210, the serving base station BS1 may handoff the user equipment to the target base station.

In one example implementation of the method of FIG. 3, the serving base station BS1 may receive the current set of cell measurements from the user equipment before step 301 and may make a handover decision. The selection in step 301 may be part of the handover decision or may be executed after the handover decision is taken.

The execution in step 307 of the handover of the user equipment to the target base station may for example comprise steps (e.g., steps 915 through 919 of FIG. 10) of a handover process which are usually executed after the serving base station has made the handover decision. The serving base station BS1 may, for example, execute steps 915 to 917 for performing the handover in step 307. This may trigger the user equipment to handover to the target base station by executing steps 918 and 919 by the user equipment.

Figure 4:
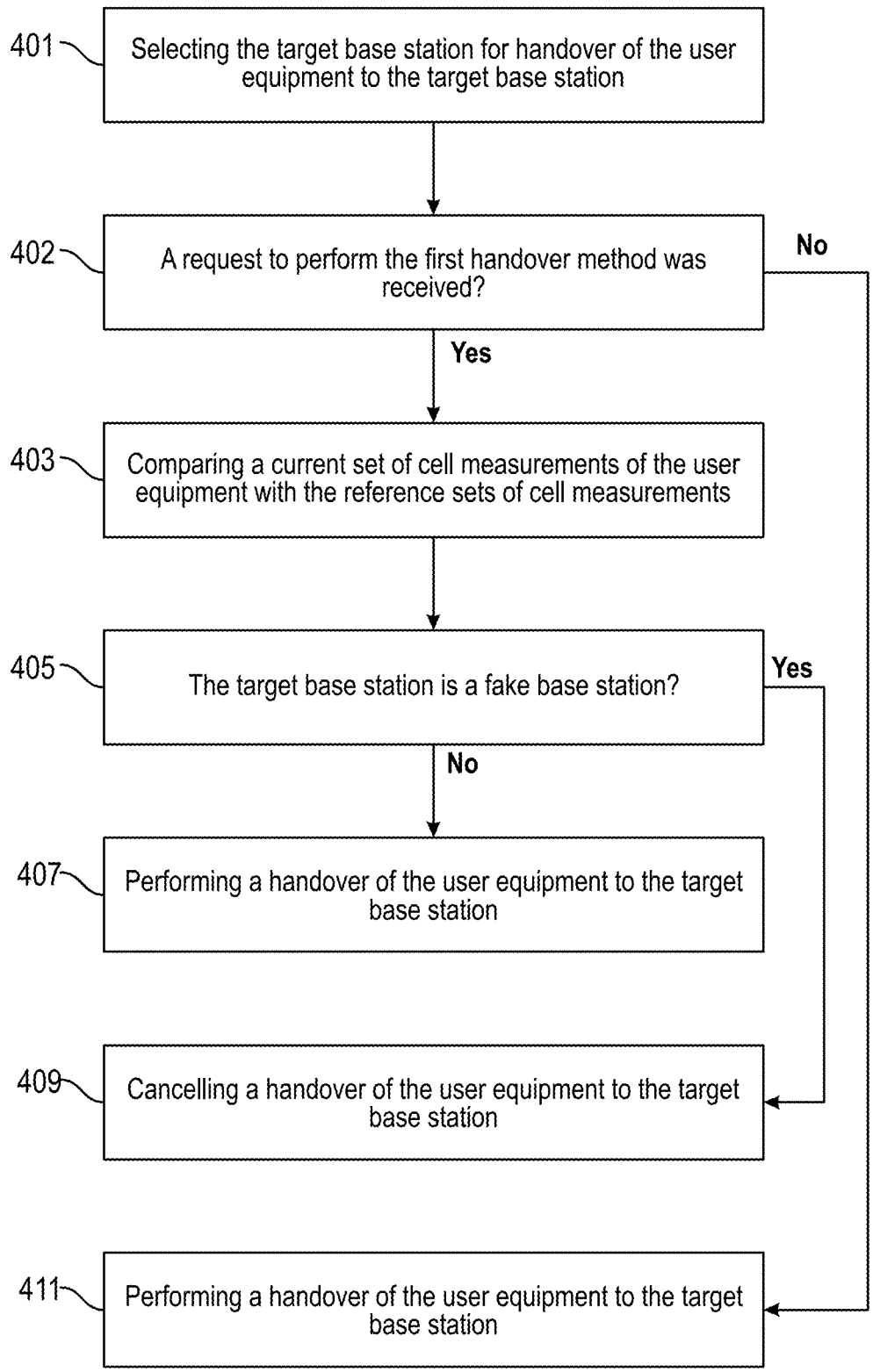
FIG. 4 is a flowchart of a method for handover according to an example of the present subject matter.

FIG. 4 is a flowchart of a method for handover of a user equipment into a target base station of a communication system according to an example of the present subject matter. For the purpose of explanation, the method described in FIG. 4 may be implemented in the system illustrated in FIG. 2, but is not limited to this implementation. The method may, for example, be performed for handover of the UE 201 to the target base station BS2 or the fake base station BS5. The method may, for example, be performed by the serving base station BS1.

A handover event may occur due to the movement of the user equipment toward the base station BS2 or the fake base station BS5. The serving base station BS1 may select in step 401 the target base station for handover of the user equipment to the target base station. In response to selecting the target base station for handover of the user equipment to the target base station, the serving base station BS1 may determine in step 402 whether a request to perform the first handover method is received. In case the request is received, the serving base station BS1 may perform the first handover method comprising steps 403 to 409. In step 403, the serving base station BS1 may compare a current set of cell measurements of the user equipment with the reference sets 210. Based on the comparison result, the serving base station BS1 may determine in step 405 whether the target base station is a fake base station. The serving base station BS1 may perform or complete in step 407 a handover of the user equipment to the target base station if the target base station is not a fake base station; otherwise, the handover to the target base station may be cancelled in step 409. For example, if there is mismatch between the current set of cell measurements of the user equipment and the reference sets 210, the serving base station BS1 may search another target base station for enabling handover of the user equipment to the other target base station. If there is match between the current set of cell measurements of the user equipment and the reference sets 210, the serving base station BS1 may handoff the user equipment to the target base station BS2.

In case the request is not received, the serving base station BS1 may perform or complete in step 411 a handover of the user equipment to the target base station BS2. Step 411 may be the second handover method. The second handover method may, for example, comprise steps (e.g., steps 915 through 919 of FIG. 10) of a handover process which are usually executed after the serving base station has made the handover decision.

Figure 5:
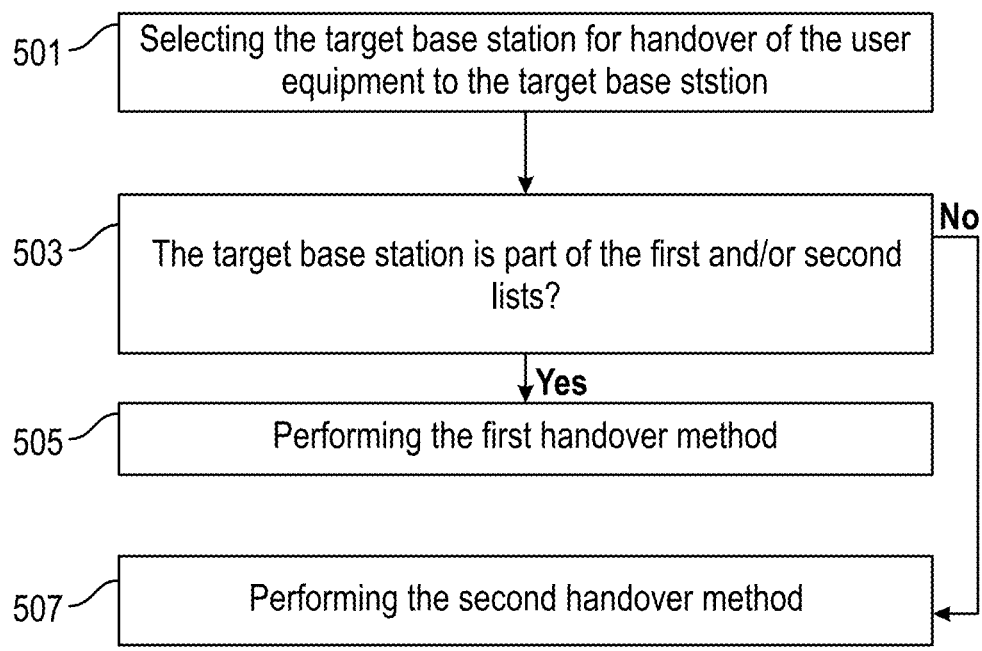
FIG. 5 is a flowchart of a method for handover according to an example of the present subject matter.

FIG. 5 is a flowchart of a method for handover of a user equipment into a target base station of a communication system according to an example of the present subject matter. For the purpose of explanation, the method described in FIG. 5 may be implemented in the system illustrated in FIG. 2, but is not limited to this implementation. The method may, for example, be performed for handover of the UE 201 to the target base station BS2 or the fake base station BS5. The method may, for example, be performed by the serving base station BS1.

A handover event may occur due to the movement of the user equipment toward the base station BS2 or the fake base station BS5. The serving base station BS1 may select in step 501 the target base station for handover of the user equipment to the target base station. The serving base station BS1 may determine in step 503 whether the target base station is part of at least one of: a first list of candidate fake base stations or a second list of fake base stations. In response to determining that the target base station is part of at least one of the two lists the first handover method may be performed in step 505. In response to determining that the target base station is not part of the two lists the second handover method may be performed in step 507.

Figure 6:
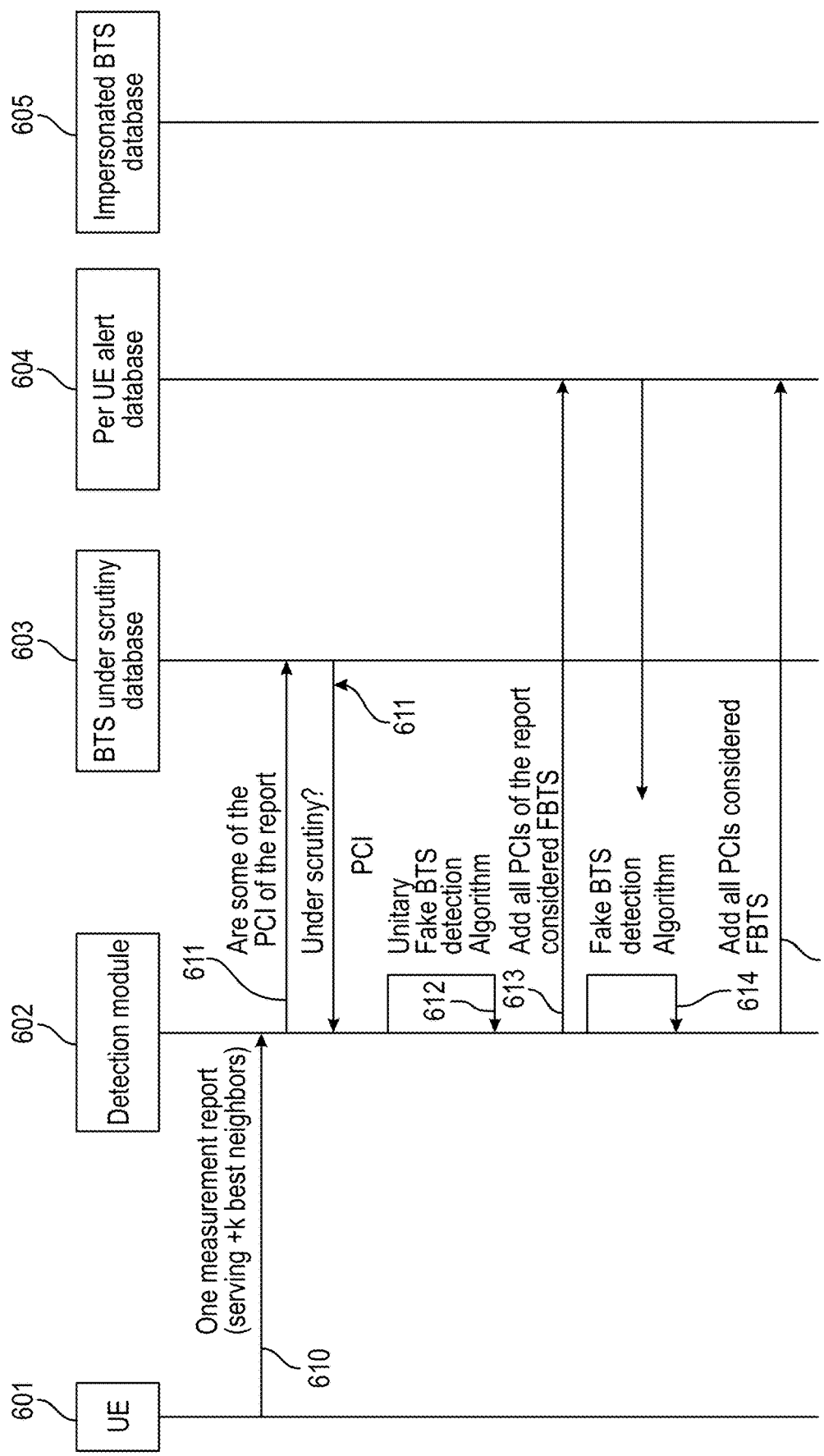
FIG. 6 is a signaling diagram of a method for creating a list of fake base stations according to an example of the present subject matter.

FIG. 6 is a signaling diagram of a method for creating the second list of fake base station in a communication system according to an example of the present subject matter. The method may be performed by a detection module 602 which may, for example, be part of each base station of the communication system.

The UE 601 which is served by a base station comprising the detection module 602 may send (610) a measurement report to the detection module 602. The measurement report may comprise cell measurement of the serving base station and k best cell measurements of k neighboring base stations. The detection module 602 may query (611) the BTS under scrutiny database 603 to determine whether a cell of the report is part of the BTS under scrutiny database 603. The BTS under scrutiny database 603 may comprise the first list of candidate fake base stations of the communication system. A PCI list may be received (611). The PCI list indicates one or more cells of the report. The detection module 602 may execute (612) the unitary fake BTS detection algorithm to determine whether any base station in the received PCI list is a fake base station. The detection module 602 may add (613) to the Per UE alert database 604 the base station(s) of the received report which are classified as fake base station. The Per UE alert database 604 may, for example, be shared between all detection modules of the communication system. After executing steps 610 to 613 several times by several detection modules, the Per UE alert database 604 may comprise a plurality of fake base stations each being associated with an occurrence number. The detection module 602 may execute (614) the fake BTS detection algorithm using the occurrence number to determine whether any base station in the Per UE alert database 604 is a fake base station. E.g., in case the occurrence number of a base station is higher than the threshold number the base station is a fake base station. The detection module 602 may add (615) to the impersonated BTS database 605 the base stations of the Per UE alert database 604 which are confirmed to be fake base station. The impersonated BTS database 605 may, for example, comprise the second list of fake base stations.

Figure 7A:
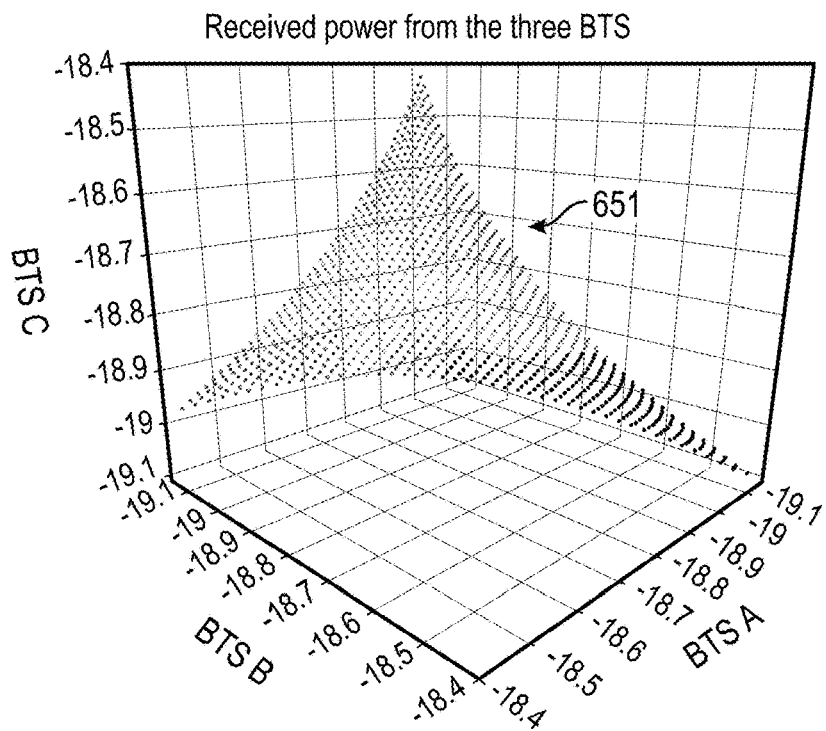
FIG. 7A is a plot representing the reference sets of cell measurements in accordance with an example of the present subject matter.
Figure 7B:
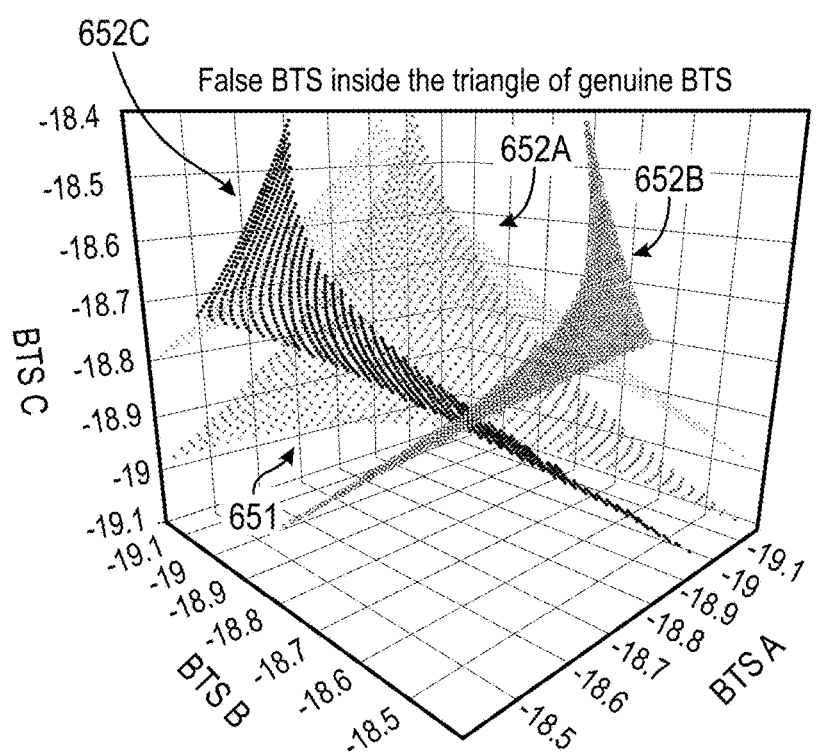
FIG. 7B is a plot representing the reference sets of cell measurements and cells measurements involving fake base stations in accordance with an example of the present subject matter.

FIG. 7A is a plot representing the reference sets of cell measurements (e.g., 210) in accordance with an example of the present subject matter. In this example, each reference set of cell measurements comprises three cell measurements of three cells associated with three BTSs BTS A, BTS B and BTS C respectively. The cell measurement in this example may be the power (e.g., RSRP) received from the BTS. The plot has three axes associated with BTS A, BTS B and BTS C respectively. Each axis represents the values of the power. The reference set of cell measurements is represented by a respective point in the plot. This may result in the cloud of points 651 representing a subset of the reference sets of cell measurements. Other subsets of the reference sets of cell measurements may be represented by other plots having axes which represent the measured cells of the reference set or cell measurements. The cloud of points 651 may be referred to as baseline cloud of points. In this example, the three BTSs BTS A, BTS B and BTS C are not fake BTSs. However, the shape of cloud of points 651 may change in case the measurements involve a fake BTS. This is indicated in FIG. 7B, where three configurations of BTSs BTS A, BTS B and BTS C are represented. Each configuration of the BTSs has one respective BTS which is a fake BTS. The sets of cell measurements of the BTSs in each configuration are represented in the plot of FIG. 7B. For example, the configuration which has the BTS A as fake BTS is represented by the cloud of points 652A, the configuration which has the BTS B as fake BTS is represented by the cloud of points 652B and the configuration which has the BTS C as fake BTS is represented by the cloud of points 652C. The present subject matter may make use of the plot of FIG. 7A, in order to detect in real time fake base stations. This is indicated with plots of FIGS. 7C through 7D.

Figure 7C:
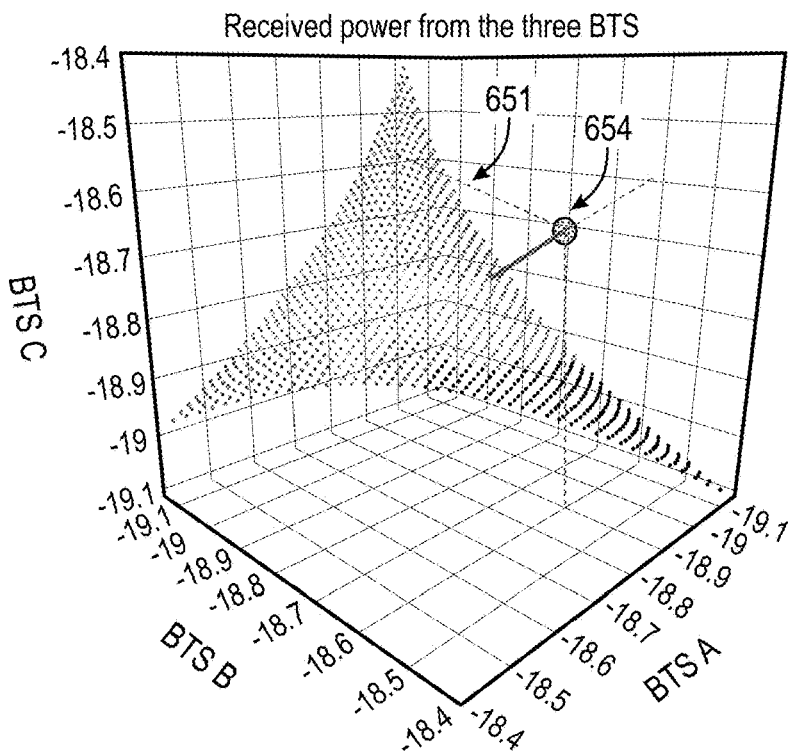
FIG. 7C is a plot representing the reference sets of cell measurements and a current set of cell measurements in accordance with an example of the present subject matter.

The plot in FIG. 7C is the plot of FIG. 7A. In addition, FIG. 7C shows a point 654 which represents a current set of cells measurements by a user equipment which is handing off to one of the three BTSs BTS A, BTS B and BTS C. The current set of cells measurements are obtained from the BTSs BTS A, BTS B and BTS C respectively. The point 654 is outside the baseline cloud of points 651. For example, if the point distance between the point 654 to the baseline cloud of points 651 is above a threshold, then the target base station may be classified as a fake base station.

Figure 7D:
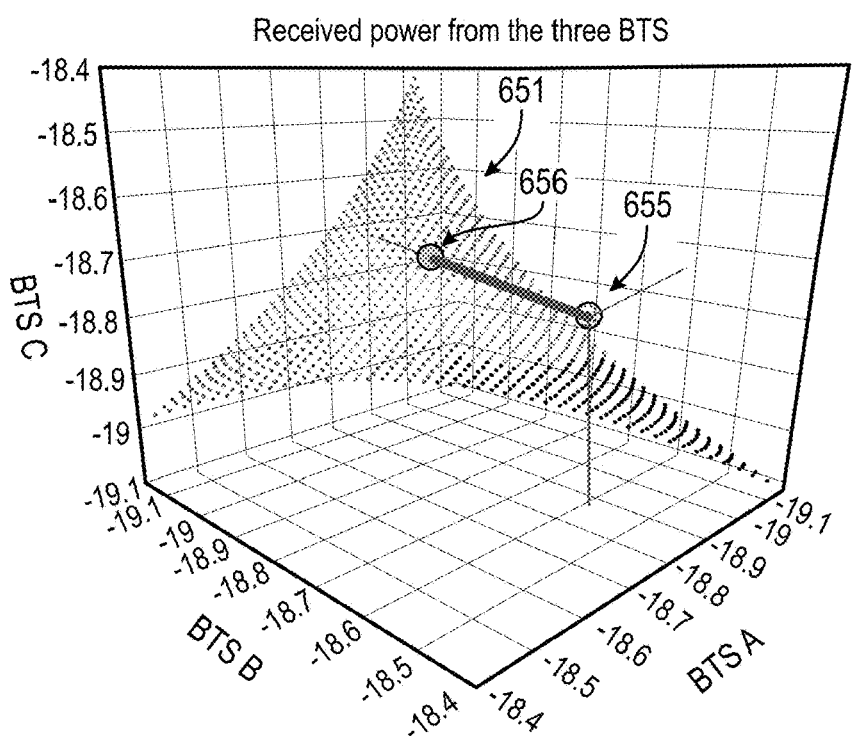
FIG. 7D is a plot representing the reference sets of cell measurements and a current set of cell measurements in accordance with an example of the present subject matter.

The plot in FIG. 7D is the plot of FIG. 7A. In addition, FIG. 7D shows a point 655 which represents a current set of cells measurements by a user equipment which is handing off to one of the three BTSs BTS A, BTS B and BTS C. The current set of cells measurements are obtained from the BTSs BTS A, BTS B and BTS C respectively. In order to determine whether the point 655 represents a fake base station the following may be performed. The 3-dimensional space data may be further transformed by projecting the cloud of point 651 along each axis, and only keeping for each point in the 2-dimensional space the highest value of the projected points. The plot of FIG. 7A may be stored as three 2-dimensional projected spaces. In this case the coordinate of the given point 656 that corresponds to the PCIs not under scrutiny will be used to get the maximum value from the corresponding 2-dimensional space, and the value of the PCI under scrutiny 655 may be compared to the maximum. If it is high than the stored maximum, then it is considered as a fake BTS. As an alternative, the detection module may be called without a target PCI. In this case, each BTS in the measurement report will be considered as suspicious. In this case, each PCI will be tested against the relevant projection.

Figure 8:
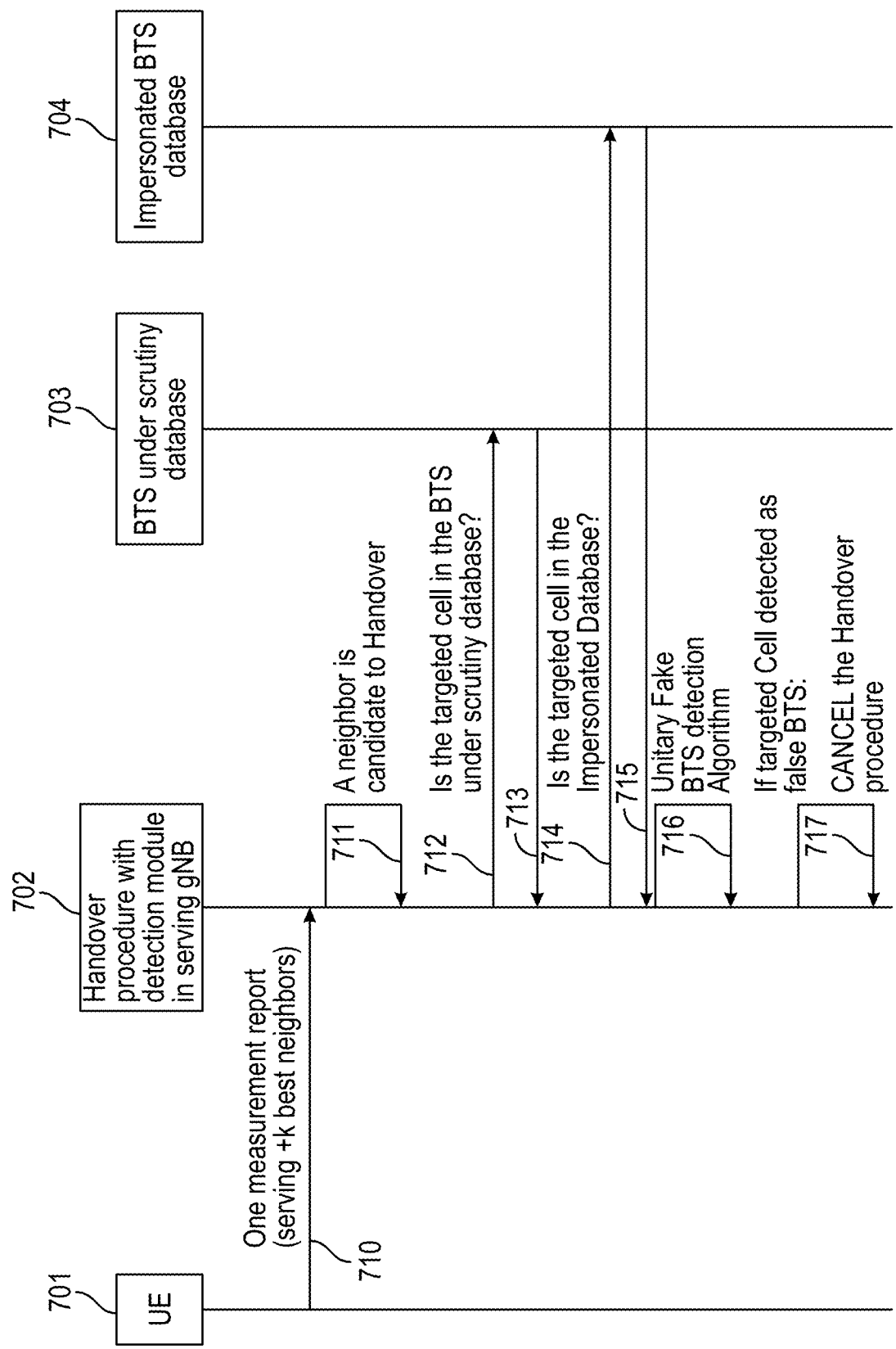
FIG. 8 is a signaling diagram of a method for handover according to an example of the present subject matter.

FIG. 8 is a signaling diagram of a method for handover of a user equipment into a target base station of a communication system according to an example of the present subject matter.

The UE 701 may send (710) a measurement report to the serving gNB 702. The serving gNB 702 comprises a detection module for detecting fake gNBs. The measurement report may comprise cell measurement of the serving gNB 702 and k best cell measurements of k neighboring gNBs. The serving gNB 702 may determine (711) that a neighbor is candidate to Handover. The serving gNB 702 may send (712) a request to the database 703 for determining whether the targeted cell is in the BTS under scrutiny database 703. A response (713) may be received accordingly from the database 703. The serving gNB 702 may send (714) a request to the database 704 for determining whether the targeted cell is in impersonated BTS database 704. A response (715) may be received accordingly from the database 704. A fake detection algorithm may be executed (716) by the serving gNB in case the targeted cell is in the database 703 and/or in the database 704. If (717) the targeted cell detected as false BTS, a CANCEL of the Handover procedure may be performed.

Figure 9:
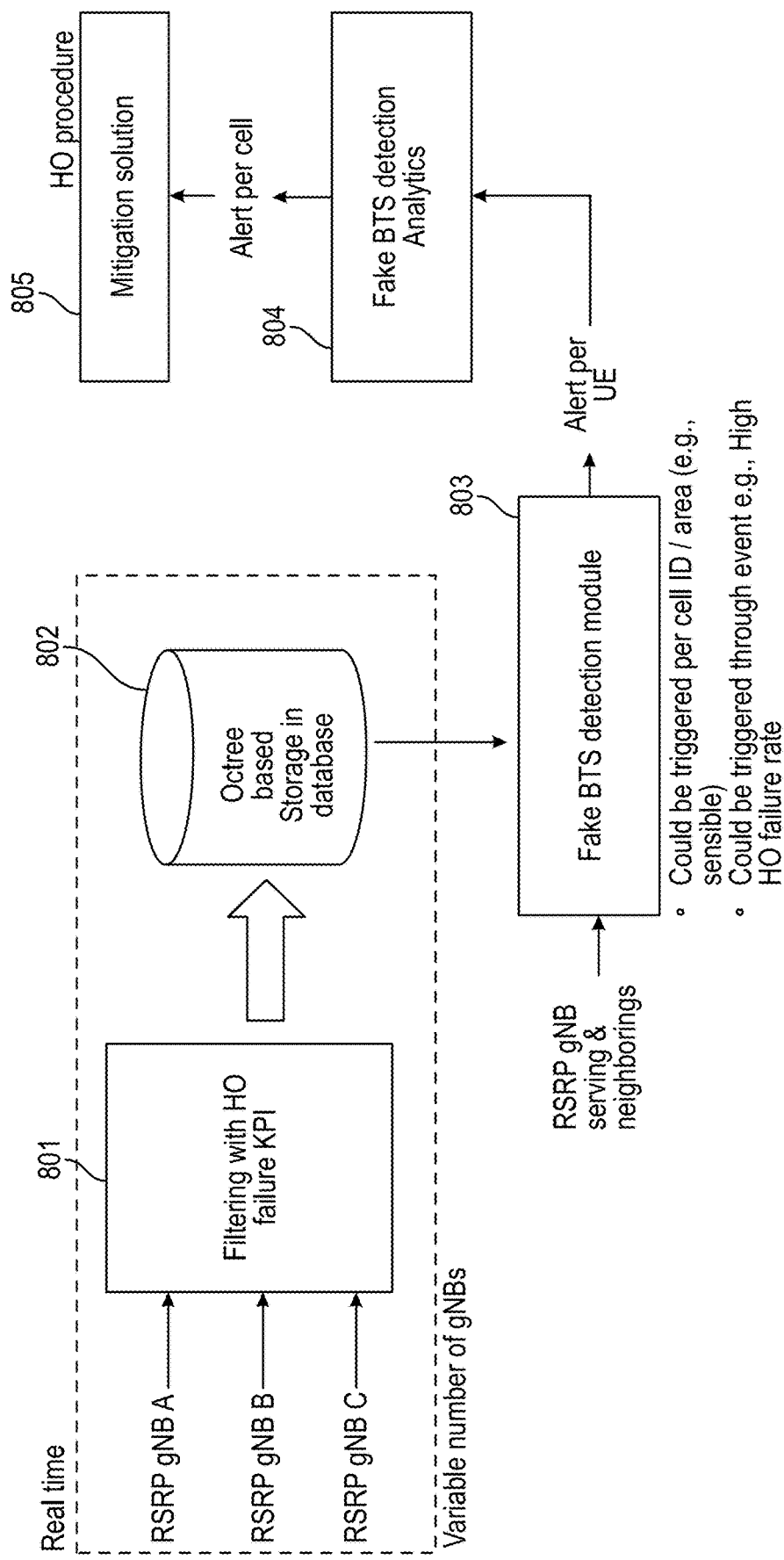
FIG. 9 depicts a diagram representing different phases for fake base station detection and mitigation in a wireless communication system in accordance with an example of the present subject matter.

FIG. 9 depicts a diagram representing different phases for enabling handover in a wireless communication system in accordance with an example of the present subject matter. The wireless communication system may comprise BTSs and UEs. The phases may comprise a preparation phase, a detection phase and a mitigation phase. The preparation phase may be implemented using a database 802. The detection phase may be performed using a fake BTS detection module 803 and fake BTS detection analytics module 804.

In the preparation phase, a baseline of normal behavior may be created from (801) historic collected information based on measurement between the UEs and the BTS, when there are no false BTS. The baselines may be used to check whether the same collected information in real time match the baselines or are considered as deviation. In a first implementation of the preparation phase, the RSRP measured by the UEs for the n strongest cells may be gathered. This may provide a cloud of points in a n-dimension space, each axis being one of the n BTS, for a list of n-tuple of BTS. For example, considering the RSRP values as real numbers and the dimension n equal to 3, cloud of points may be approximated with octrees. The depth of the octree giving the precision of the approximation. In this case, the baseline may consist in a dictionary of BTS triplets keys, to each triplet corresponding an octree. This approach may be generalized for dimension n higher than 3. To go beyond dimension 3, k-d trees may be used. The database 802 may store instances of octrees on the experimental data. In real time, the n best RSRPs may be gathered from a UE and the values may be checked to be included in the corresponding octree. Checking if a 3D point is inside an octree may be a very fast operation (the insertion of a new point as well, the time complexity being in O(depth)). The nearest neighbor search may be used as an alternative metric instead of the simple inclusion. This search may also be fast (logarithmic time) and may enable to use a threshold for the distance to the nearest neighbor to be considered as a deviation, for a tunable sensibility of the detection.

In a second implementation of the preparation phase, the preparation may be based the fact that (e.g., in 4G and 5G) the RSRP measurement reported values may be on a discrete scale that can be expressed by natural numbers (the precision of the measurement being of 1 dBm). In addition, the scales may have less than 127 RSRP measurement reported values, meaning that they can be stored on 7 bits. In this case, the same technique as the first implementation may be used but substituting the natural values to the octrees. So, for each BTS triplets, a cloud of voxels may be provided. This corresponds to the octrees of realization 1 of depth 7. To store and compress these voxels, the octree technique may be used. The detection mechanism for deviation may be similar to the first implementation.

In a third implementation of the preparation phase, the second implementation (voxels) may first be performed. For each collection of voxels, each axis may be considered independently. This may enable obtain false BTS inducing a deviation from what have been recorded in a normal usage. The critical moment may be when the UE is so near the false BTS (FBTS) that the network may propose to handover to this FBTS. At this moment, the RSRP of the FBTS may be the highest. A search for deviation of too high power instead of just looking for any type of deviation may be performed. For each triplet of BTS (bts1, bts2, bts3), one may build three 2D maps, each one only keeping the highest value of one of the axis. This could be stored as three 2-dimensional arrays whose values would be the maximum value along the third axe. These discrete maps can be compressed without loss by classical algorithms. The size of this baseline is 3×127×127=48387 octets per BTS triplet. Compression without loss techniques can be applied to these maps to gain space. To check for a deviation, the values of the best 3 RSRPs may be obtained in real time. If there is already a suspected FBTS impersonating one PCI, then the choice of the map may be the one that will check the maximum value of the impersonated BTS. Once the map is chosen, a check if the value for the impersonated BTS is higher than the corresponding points in the map may be performed. A threshold may be used to introduce a tunable sensibility of the detection.

In a fourth implementation of the preparation phase, which is a variant of the third implementation but for dimension 2 instead of 3. Having only 2 dimensions may augment the risk of 'collisions', meaning that several physical positions of the UE could lead to the same RSRP measurements, and may diminish the precision of the detection. This implementation is envisaged because by default, the UE will report regularly the RSRPs values for the serving cell and the best neighboring cell. As these values will be reported for free, baselines based on these two dimensions may be documented and evaluated. Instead of having the three best RSRP, only two are taken, namely the serving cell and the best neighboring cell which will give a 2-dimensional map. Only the maximum values may be kept on each of these axes, giving 2 maximum curves for each duet of BTS. To check for a deviation, the measurement reports of the serving cell and the best neighbor RSRPs may be used. After fetching the correct map from the baselines, one may only need to look whether the best neighbor RSRP is above the curve for the corresponding value of the serving cell.

Once the baselines have been created and stored, they can be used to detect if a base station is impersonated by a False BTS. Each detection scheme may get some information from the UE, wherein the nature and number of information may depend on the type of baseline used in the preparation phase. For instance, for the first, second and the third implementations of the preparation phase, the information may comprise at least three best RSRP from the neighbors BTS of a UE. For the fourth implementation of the preparation phase, the information may consist only of the RSRP of the serving cell and strongest neighbor cell. For each baseline a metric is associated that can check for the deviation given the necessary data in input. The fake BTS detection module 803 has access to the baselines database 802 and may activate the relevant metric with the relevant data. The fake BTS detection module 803 may do the test on demand or on a continuous basis. The fake BTS detection module 803 may have a list of cell ID to monitor (either directly or deduced from a geographical zone).

For each of these cells, the fake BTS detection module 803 may gather the necessary data. For the fourth implementation, the data may already be available by default. For the first three implementations, a command to report for the three best RSRPs from the neighboring cells when one of them is in the watch list may need to be sent to the relevant UEs. Once gathered, the relevant data may be used to activate the metric on the relevant baseline and an alert per UE (with the associated watched cell ID) can be triggered in case of positive checking of a deviation.

The fake BTS detection analytics module 804 may receive all the alerts from the Fake BTS detection module 803 and decides when a cell ID has been impersonated by a false BTS. This could be realized with a simple threshold system on a time window. The decision could be more complex, correlating other information. In one realization, a cell ID may be sent to the fake BTS detection module watch list whenever the rate of handover failure for this particular cell ID is above a certain threshold. The presence of a false BTS impersonating a Cell may always lead to handover failure of any UE that tries to connect to it. Thus, a high rate of handover failure for a BTS can be a sign of a software or hardware problem, or the presence of a FBTS impersonating the BTS. The present method enables to distinguish between the two by adding the BTS cell ID to the watch list of the Fake BTS detection module 803. For this cell ID, the Fake BTS detection analytics module 804 may have a low threshold of decision as the BTS is already showing problems that maybe an indication of False BTS. If a BTS on the watch list doesn't have a high handover failure rate while having a high rate of handover success, the threshold may be higher. On a successful detection, the Fake BTS detection analytics module 804 may produce an alert per BTS (stating that there a very high suspicion that this BTS is impersonated by a Fake BTS).

The detection alert may be used by the network in several ways. The alerts may, for example, be used for mitigation (805). Once the network knows that a BTS is supposedly impersonated by a Fake BTS, the network may condition handovers to this BTS to a non-detection of deviation by the fake BTS detection module 803 used on demand for this UE and this particular BTS. This way, even if there is a fake BTS impersonating a real BTS, the UEs that want to handover to the genuine BTS can still do their handover. Only the UEs that would have tried to connect to the fake BTS may be refused the handover (which will lead to stay with the serving cell or handovers to the next best cell).

Figure 10:
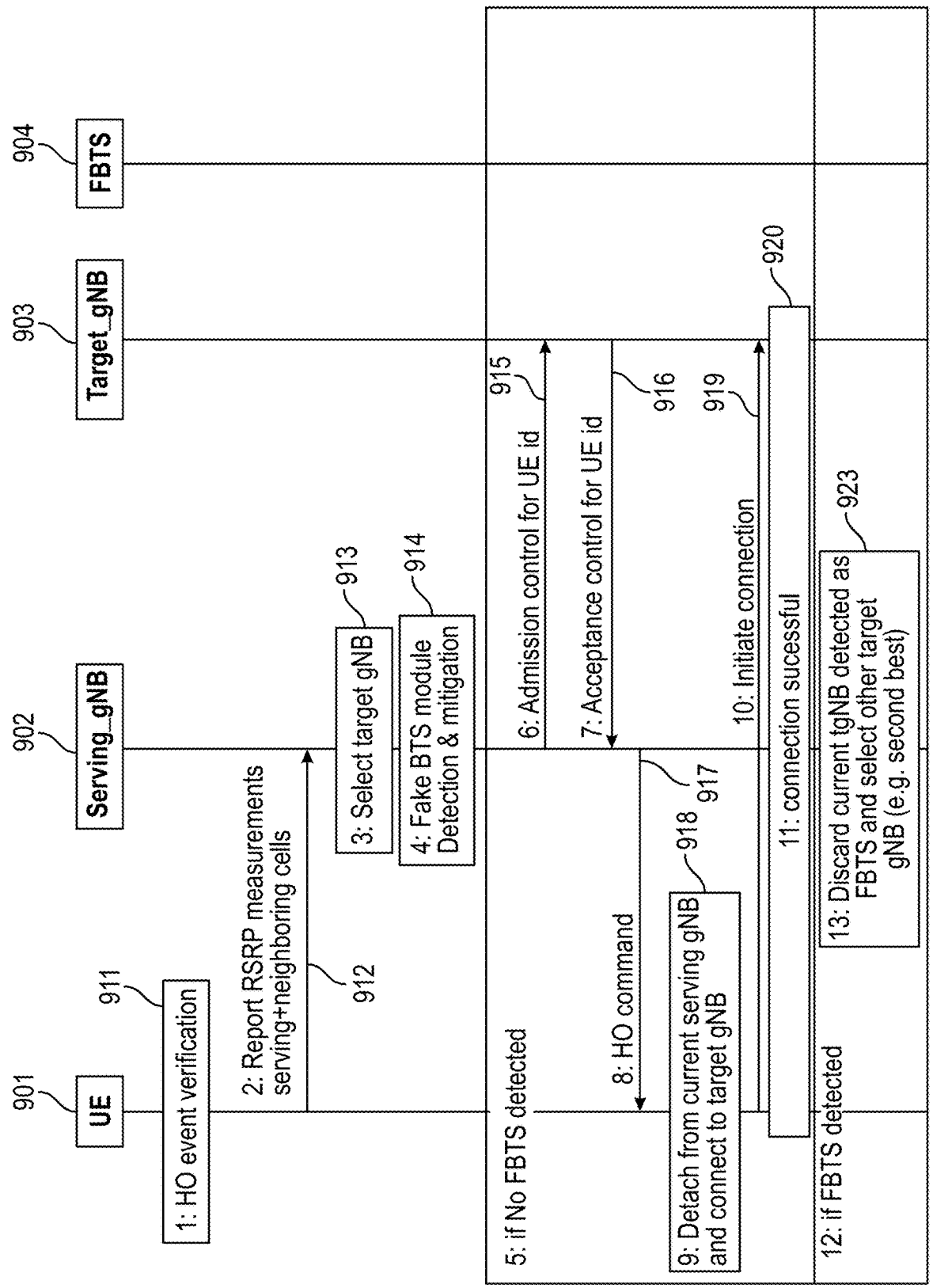
FIG. 10 is a signaling diagram of a method for handover in accordance with an example of the present subject matter.

FIG. 10 is a signaling diagram of a method for handover in accordance with an example of the present subject matter. The handover concerns a UE 901 that is served by a gNB 902.

The UE 901 may perform a HO event verification in step 911. The UE 901 may report in step 912 RSRP measurements of the serving and neighboring gNBs. The serving gNB 902 may select in step 913 the target gNB 903 which is close to a FBTS 904. The fake BTS detection module (e.g., 803 and 804) may be used to detect a FBTS in step 914. If the FBTS does not exist, steps 915 to 920 may be performed; otherwise, step 923 may be performed. In step 915, the serving gNB 902 may send the target gNB 903 an admission control for UE id. In step 916, the target gNB 903 may send the serving gNB 902 an acceptance control for UE id. In step 917, the serving gNB 902 may send the UE 901 a HO command to the target gNB 903. In step 918, the UE 901 may detach from the serving gNB 902 and connect to the target gNB 903. In step 919, the UE 901 may initiate the connection with the target gNB 903. The connection may be successful (as indicated by 920). In step 923, the serving gNB 902 may discard the current target gNB 903 detected as FBTS and select another target gNB so that the UE can handover to it.

Figure 11:
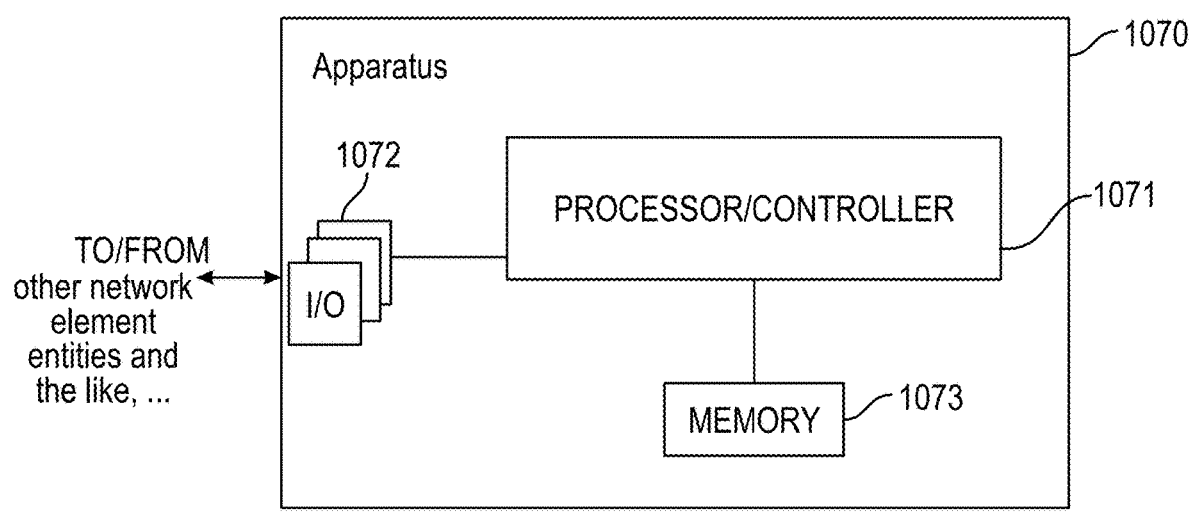
FIG. 11 is a block diagram showing an example of an apparatus according to an example of the present subject matter.

In FIG. 11, a block circuit diagram illustrating a configuration of an apparatus 1070 is shown, which is configured to implement at least part of the present subject matter. It is to be noted that the apparatus 1070 shown in FIG. 11 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform the method as described in connection with FIG. 3, 4, or 5.

For example, the processor 1071 is configured for: in response to selecting a target base station for handover of the user equipment to the target base station performing a first handover method by at least: comparing a current set of cell measurements of the user equipment with reference sets of cell measurements for determining whether the target base station is a fake base station; performing a handover of the user equipment based on a determination that the target base station is not a fake base station.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention.

Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. An apparatus for handover of a user equipment to a target base station of a communication system, the apparatus comprising: at least one processor; and at least one memory storing instructions that, when executed by the at least one processor, cause the apparatus at least to perform:
providing reference sets of cell measurements, each reference set of cell measurements comprising cell measurements of a respective set of cells; and
in response to selecting the target base station for handover of the user equipment to the target base station performing a first handover method comprising at least:
comparing a current set of cell measurements of the user equipment with the reference sets of cell measurements for determining whether the target base station is a fake base station; and
performing a handover of the user equipment based on a determination—that the target base station is not a fake base station,
wherein the number of cell measurements being n, the apparatus being further caused to perform:
determining a n-dimensional space of points whose axes are associated with the n cells, wherein each point represents a respective reference set of cell measurements;
projecting the points along each axis, thereby creating a number n of (n−1)-dimensional projected spaces associated with the cells respectively; and
using the (n−1)-dimensional projected spaces for comparing the current set of cell measurements with the reference sets of cell measurements.

2. The apparatus of claim 1, wherein the instructions, when executed by the at least one processor, further cause the apparatus at least to perform:
determining whether the target base station is part of at least one of: a first list of candidate fake base stations or a second list of fake base stations;
in response to determining that the target base station is part of at least one of the first list or the second list, performing the first handover method;
in response to determining that the target base station is not part of the first and second lists performing a second handover method comprising at least: performing a handover of the user equipment to the target base station.

3. The apparatus of claim 2, wherein the instructions, when executed by the at least one processor, further cause the apparatus at least to perform: adding to the second list the target base station if the target base station is a fake base station and is not part of the second list.

4. The apparatus of claim 2, wherein the comparison of the current set of cell measurements of the user equipment with the reference sets of cell measurements for determining whether the target base station is a fake base station is performed in accordance with a first detection algorithm, the apparatus being further caused to build the second list of fake base stations by at least:
executing the first detection algorithm multiple times for different user equipments, resulting in determinations of respective fake base stations;
adding each resulting fake base station to the list based on the number of times the base station was detected as fake base station.

5. The apparatus of claim 1, wherein the instructions, when executed by the at least one processor, further cause the apparatus for performing the comparing of the current set of cell measurements with the reference sets of cells measurement comprising at least:
identifying a minimum deviation of the current set of cell measurements from the reference sets;
comparing the minimum deviation with a threshold; and
in response to determining that the minimum deviation exceeds the threshold, determining that the target base station is a fake base station.

6. The apparatus of claim 5, wherein the instructions, when executed by the at least one processor, further cause the apparatus for identifying the minimum deviation by at least computing the deviations between the current set of cell measurements from the reference sets using a similarity metric, and selecting the lowest computed deviation.

7. The apparatus of claim 1, wherein the instructions, when executed by the at least one processor, further cause the apparatus to perform the first handover method automatically or upon receiving a request.

8. The apparatus of claim 7, wherein in response to selecting the target base station for handover of the user equipment to the target base station and in case the request is not received, the apparatus is further caused to perform a second handover method.

9. The apparatus of claim 1, wherein the instructions, when executed by the at least one processor, further cause the apparatus at least to perform: regularly updating the reference sets of cell measurements by at least one of: adding sets of cell measurements or removing sets of cell measurements.

10. The apparatus of claim 1, the wherein the instructions, when executed by the at least one processor, further cause the apparatus at least to perform: storing the reference sets of cell measurements in a database, wherein each record of the database represents a respective set of cell measurements of the reference sets of cell measurements.

11. The apparatus of claim 1, wherein the instructions, when executed by the at least one processor, further cause the apparatus at least to perform: storing the predefined sets of cell measurements in an octree database, wherein the octree of the octree database represents a respective set of cell measurements of the predefined sets of cell measurements.

12. The apparatus of claim 11, wherein the instructions, when executed by the at least one processor, further cause the apparatus to compare the current set of cell measurements with the reference sets of cells measurement by at least:
determining whether the current set of cell measurements corresponds to an octree of the octree database;
in response to determining that the current set of cell measurements does not correspond to an octree of the octree database, determining that the target base station is a fake base station.

13. The apparatus of claim 1, wherein the set of cell measurements comprises the highest n cell measurements, wherein n is 2, 3, 4 or another number of measurements that can be used for the determining whether the target base station is a fake base station.

14. The apparatus of claim 1, the cell measurement being a reference signal received power (RSRP) or reference signal received quality (RSRQ) measurement.

15. The apparatus of claim 1, wherein the instructions, when executed by the at least one processor, further cause the apparatus to receive the current set of cell measurements automatically or upon sending a message to the user equipment.

16. The apparatus of claim 1, wherein the instructions, when executed by the at least one processor, further cause the apparatus at least to perform:
receiving automatically an initial current set of cell measurements from the user equipment,
determining whether the initial current set of cell measurements has a same number of measurements as the reference sets;
in response to determining that the initial current set of cell measurements has a different number of measurements compared to the reference sets, controlling the user equipment to perform and send the current set of measurements;
wherein in case the initial current set of cell measurements has the same number of measurements as the reference sets, the current set of cell measurements is the initial current set of cell measurements.

17. A method for handover of a user equipment into a target base station of a communication system, the method comprising:
providing reference sets of cell measurements, each reference set of cell measurements comprising cell measurements of a respective set of cells; and
in response to selecting the target base station for handover of the user equipment to the target base station performing a first handover method comprising at least:
comparing a current set of cell measurements of the user equipment with the reference sets of cell measurements for determining whether the target base station is a fake base station; and
performing a handover of the user equipment based on a determination that the target base station is not a fake base station,
wherein the number of cell measurements being n, the method further comprises:
determining a n-dimensional space of points whose axes are associated with the n cells, wherein each point represents a respective reference set of cell measurements;
projecting the points along each axis, thereby creating a number n of (n−1)-dimensional projected spaces associated with the cells respectively; and
using the (n−1)-dimensional projected spaces for comparing the current set of cell measurements with the reference sets of cell measurements.

18. The method of claim 17, further comprising:
determining whether the target base station is part of at least one of: a first list of candidate fake base stations or a second list of fake base stations;
in response to determining that the target base station is part of at least one of the first list or the second list, performing the first handover method;
in response to determining that the target base station is not part of the first and second lists performing a second handover method comprising at least: performing a handover of the user equipment to the target base station.

19. A system for handover of a user equipment to a target base station, the system comprising an apparatus and the user equipment, the apparatus being a base station serving the user equipment, the apparatus comprising:
at least one processor; and at least one memory storing instructions that, when executed by the at least one processor, cause the apparatus at least to perform:
providing reference sets of cell measurements, each reference set of cell measurements comprising cell measurements of a respective set of cells; and
in response to selecting the target base station for handover of the user equipment to the target base station performing a first handover method comprising at least:
comparing a current set of cell measurements of the user equipment with the reference sets of cell measurements for determining whether the target base station is a fake base station; and
performing a handover of the user equipment based on a determination that the target base station is not a fake base station-(BS5),
wherein the user equipment is configured to handover according to the first handover method to the target base station in response to the apparatus performing the handover, and
wherein the number of cell measurements being n, the apparatus being further caused to perform:
determining a n-dimensional space of points whose axes are associated with the n cells, wherein each point represents a respective reference set of cell measurements;
projecting the points along each axis, thereby creating a number n of (n−1)-dimensional projected spaces associated with the cells respectively; and using the (n−1)-dimensional projected spaces for comparing the current set of cell measurements with the reference sets of cell measurements.

\* \* \* \* \*